United States Patent [19]

Yamamoto

[11] 4,157,038
[45] Jun. 5, 1979

[54] LIQUID METER WITH AN ENLARGED RANGE OF INDICATION MECHANISM

[75] Inventor: Harushige Yamamoto, Tokyo, Japan

[73] Assignee: Niles Parts Co., Ltd., Japan

[21] Appl. No.: 880,179

[22] Filed: Feb. 22, 1978

[30] Foreign Application Priority Data

Apr. 28, 1977 [JP] Japan .................. 52/054498[U]

[51] Int. Cl.² ............................................. G01F 23/10
[52] U.S. Cl. ...................................... 73/313; 73/307; 73/317
[58] Field of Search .................. 73/307, 308, 313, 317

[56] References Cited

U.S. PATENT DOCUMENTS

| 1,154,162 | 9/1915 | Baker | 73/308 X |
| 2,448,783 | 9/1948 | De Giers et al. | 73/313 X |
| 2,533,091 | 12/1950 | Campani | 73/313 X |
| 3,482,200 | 12/1969 | Hamilton | 73/313 X |
| 3,813,941 | 6/1974 | Miguel et al. | 73/313 |

Primary Examiner—Charles Gorenstein
Attorney, Agent, or Firm—Lane, Aitken & Ziems

[57] ABSTRACT

A liquid meter with an enlarged range of indication mechanism for indicating a residual quantity provided with a fuel sender gage fitted with a float working to detect the quantity of liquid. The float has a suitable number of contacts arranged thereon to change the effective resistance values of resistors built in the fuel sender gage as the float lowers with a decrease in the quantity of liquid. The meter ranges are changed over two stages or three stages automatically and the current to a fuel meter connected to the fuel sender gage, comprising an ammeter, is controlled. Changeover of the meter ranges is indicated through a lamp to enable an enlarged indication of the residual quantity to be made.

9 Claims, 4 Drawing Figures

LIQUID METER WITH AN ENLARGED RANGE OF INDICATION MECHANISM

BACKGROUND OF THE INVENTION

1. Field of the Invention

The present invention relates to a liquid meter providing an enlarged range of indication of a residual quantity of liquid by changing over plural meter ranges automatically with the use of a single liquid meter.

2. Description of the Prior Art

In automobiles, a fuel gage or meter has conventionally been used and in general is of such a type that varies the resistance value of a single current limiting resistor body as a float having a grounded contact moves according to the quantity of fuel. The gage operates an ammeter to indicate a variance in the resistance value of the limiting resistor. However, the fuel gage meter of the type described above has virtually always included the disadvantage that the meter indication is rough and in particular, when the residual quantity of fuel lessens, an error in the residual quantity indication is significantly great. This results in a failure to refill the task with gasoline on frequent occasions.

SUMMARY OF THE INVENTION

A principal object of the present invention is, in terms of eliminating such technological shortcomings incurred with conventional fuel gages, to provide a liquid meter permitting an enlarged indication of a residual quantity of liquid by automatically changing the indication over two or three stages of meter ranges.

It is another object of the present invention to provide a liquid meter with an enlarged range of indication mechanism of the residual quantity of liquid enabling the residual quantity of liquid to be indicated more significantly for lesser remaining liquid quantities with a relatively simple configuration.

It is a further object of the present invention to provide a liquid meter with an enlarged range of indication mechanism of the residual quantity of liquid allowing the change in the meter ranges to inform the user as a warning through an indicator lamp.

It is another object of the present invention to provide a fuel or liquid meter with an enlarged range of indication mechanism of the residual quantity of liquid characterized in that an indicator lamp is incorporated in the fuel or liquid meter.

It is a still further object of the present invention to provide a liquid meter with an enlarged range of indication mechanism of the residual quantity characterized in that contacts arranged on a float are worked to follow a circular-arc motion with a support arm fitted to the float and provided with an arm rotating with a fixed point as a pivot.

Accordingly, a liquid meter according to the invention has an enlarged range of indication for indicating the residual quantity of fuel in a container. The meter comprises the combination of a power source, a fuel meter, a fuel sender gage, and a float. Preferably, the meter includes a warning indication device to indicate when the meter mechanism is reading the enlarged range representing a lesser quantity of fuel.

In one embodiment, the fuel meter, preferably comprising an ammeter, has one end in electrical circuit with the power source. The fuel sender gage includes a plurality of resistors, preferably a pair according to the preferred embodiment, arranged on a base plate of the gage. One end of each resistor of the plurality of resistors is connected to the other end of the fuel meter. A conductor is arranged on the fuel sender gage in a physical relationship with at least one of the plurality of resistors so that one end of the conductor is electrically connected to the power source while the other end is arranged so that it can be connected to any one of a plurality of contacts on the float when the float is at a specific position.

The float, which is responsive to the residual quantity of fuel and rises or falls within the container, includes a plurality of electrically-connected contacts. Each of the contacts is connected to a source of reference potential. Movement of the float causes one of the contacts to traverse one of the resistors causing a variation in the effective resistance of that resistor until the float reaches a predetermined level, at which time that contact is transferred to another of the resistors of the plurality of resistors on the fuel sender gage. At the time of transfer, another contact on the float engages the conductor on the fuel sender gage to cooperate with the warning indication device to indicate that the resistors have been changed over. Thus, according to the invention, the fuel meter will read over a broad range until the float reaches a predetermined level, at which time, the full range indication on the fuel meter represents a lesser quantity of fuel, for example, one fifth of the original full gage indication.

In an alternative embodiment, the plurality of resistors are circular and arc-shaped in configuration, as is the conductor. The float is joined to a conductive arm which includes the plurality of contacts which are connected to a source of reference potential through the conductive arm. The arm turns about a fixed point as a pivot and the contacts are arranged relative to the conductor to cause the resistors in circuit with the fuel meter to be changed over one to another through any one of the contacts moving with the float while engaging the conductor after the changeover has been affected at a predetermined level with the container.

DESCRIPTION OF THE PREFERRED EMBODIMENTS

Figure 1:
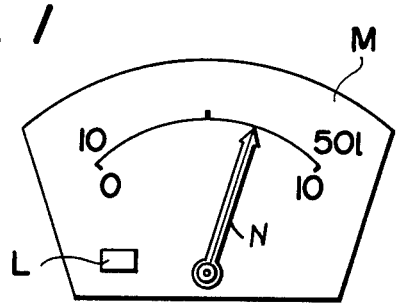
FIG. 1 shows the front view of a fuel meter.

Referring now to the drawings, there is given a detailed description of the embodiments of the present invention.

FIG. 1 shows, for example, an automobile fuel meter M comprising an ammeter. The meter M has a first scale range of 50 liters, for example, for indicating the residual quantity of fuel when the fuel tank is filled fully with fuel, or nearly filled. The meter M also has a second scale range of 10 liters. When the residual quantity of fuel reduces to slightly under 10 liters, the meter needle N instantaneously swings back to the full scale position (formerly the 50 liter position on the first range). Thereafter the full range of indication lies in the 0–10 liter range.

In the first range, a in residual quantity of 50 liters of fuel is indicated in FIG. 1, whereas in the second range, the residual quantity of 10 liters of fuel can be indicated substantially at the same needle stroke. It can therefore be understood readily how the indication is enlarged and made with a high accuracy after fuel decreases to one-ffth of the original quantity.

The change of range can be observed, for example, because a lamp L built in the fuel meter M, when illuminated, indicates that the quantity of liquid is being indicated through the second or narrower range of fuel indication.

Figure 2:
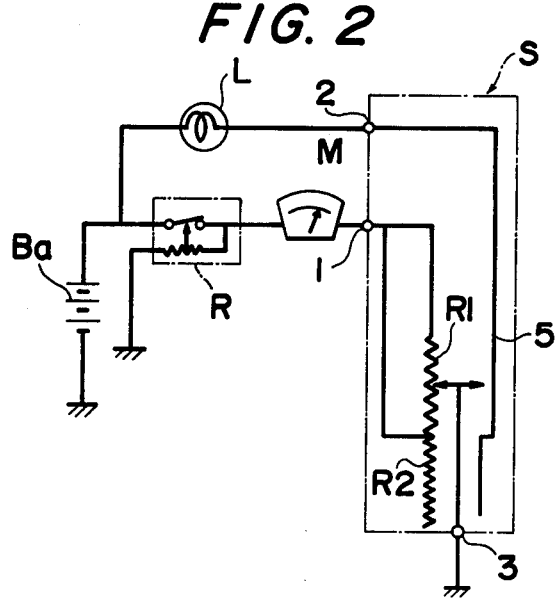
FIG. 2 shows the electric circuit diagram of the embodiment of the present invention.

In the electric circuit diagram of FIG. 2, one end of the fuel meter M is connected to a battery Ba via a regulator R for adjustment of the indication. The other end is connected to the terminal 1 of a fuel sender gage S. The lamp L for the second or narrower range is connected between the battery Ba and the terminal 2 of fuel sender gage S.

Moreover, the lamp L is not necessarily used only for indicating the second range; it also is applicable to any warning indication device.

Figure 3:
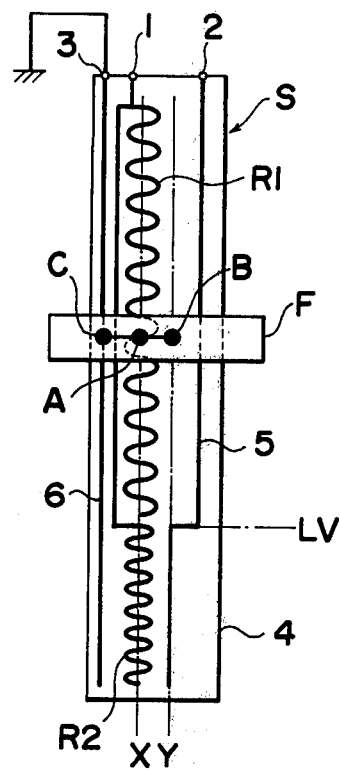
FIG. 3 is a plan view showing the construction of the fuel sender gage of the embodiment shown in FIG. 2.

The fuel sender gage S, as illustrated in FIG. 3, consists of a first resistor $R_1$, a second resistor $R_2$, a conductor 5 and a grounding wire 6 which are arranged on a base plate 4. These parts may be printed on a dielectric base plate 4. One end of each of the first resistor $R_1$ and the second resistor $R_2$ is connected to the terminal 1. One end of each of the conductor 5 and the grounding wire 6 is respectively connected to the terminals 2 and 3. A float F on the liquid surface is fitted with a contact A in electrical contact with the resistor $R_1$, a contact B is in electrical contact with the conductor 5 and a contact C is in electrical contact with the grounding wire 6. The contacts A, B and C are kept connected to each other. The individual ends of the first resistor $R_1$ and second resistor $R_2$ are both kept connected to the terminal 1, and the free end of the first resistor $R_1$ and the connected end (the end connected to the terminal 1) of the second resistor $R_2$ are placed close together at a specified point at the level position shown by LV on the base plate 4. The moving tracks of contacts A and B are represented by short-dash lines designated by the reference characters X and Y.

The conductor 5 is not on the short-dash line Y in the range between the terminal 2 and the level LV. In the range under the level LV, it is so arranged as to be situated on the short-dash line Y, so that electrical contact can be maintained between the contact B on the float F and conductor 5.

Contact between the contact C and the grounding wire 6 is retained throughout the entire range of the travelling stroke of the float F. The terminal 3 is kept grounded.

There is given below the description of operation of the liquid meter of the present invention having the abovementioned configuration.

When the fuel tank is filled with fuel, the float F is at its highest level. In other words, the contact A is at a position where it contacts the end of the first resistor $R_1$. The contacting point is grounded by an electric circuit running from the contact A to contact C, grounding wire 6, terminal 3 and ground in this order. Since a specified current controlled substantially by the regulator R flows to the fuel meter M, the needle of said fuel meter M points to the full scale, or 50'-liter scale. The float F goes down as fuel is consumed; accordingly, the contacting point of the first resistor $R_1$ and contact A lowers and as a result, the resistance value of resistor $R_1$ increases in proportion to the residual quantity.

Therefore, the deflection of the needle of fuel meter M reduces progressively. At a specified level position LV, that is, once the residual quantity decreases beyond 10 liters, the contact A leaves the free end of the first resistor $R_1$ and touches the end of the second resistor $R_2$. As the current limiting resistance value then is zero, the needle of fuel meter M swings to the full scale position as in the aforementioned first range. While on the other hand, the contact B begins to make electrical contact with the conductor 5 at this point of time and the lamp L illuminates because one end thereof is grounded via the conductor 5. Thereby it is indicated that the meter ranges have been changed over from the first range to the second range. When the residual quantity continues further to decrease, it can be indicated through the meter because the resistance value of second resistor $R_2$ increases progressively as in the foregoing operation. The full resistance values of the first resistor $R_1$ and second resistor $R_2$ are both set equally and the position of level LV, although it also depends on the shape of fuel tank, is substantially set to a place representing one-fifth of the entire travelling stroke of the contact A, for example, in the embodiment of the present invention if the fuel tank is such that the fuel surface area remains unchanged at all times.

Figure 4:
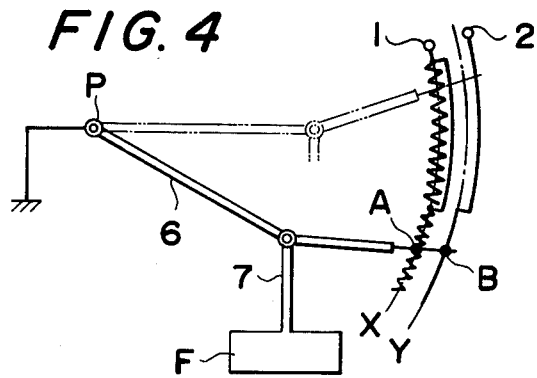
FIG. 4 shows an enlarged diagrammatic representation of another embodiment of the present invention.

FIG. 4 shows another embodiment of the present invention.

The contacts A and B make a circular-arc motion and do not transfer in a vertical direction on straight lines. The contacts A and B are fitted to the top of arm 6 turning with a fixed point P as a pivot and further, a support arm 7 of the float F is joined with a spindle to a part of the arm 6 in a freely turnable condition. The contacts A and B are kept in a constantly grounded state because the arm 6 is made from a conductive material and the fixed point P is grounded. Hence the contact C and the grounding wire 6 in the aforementioned embodiment may be substantially omitted in the embodiment of FIG. 4.

Although illustrative embodiments of the present invention have been described in detail herein with reference to the accompanying drawings, it is to be understood that the invention is not limited only to a fuel tank and widely applicable to a radiator liquid tank, washer liquid tank and other liquid tanks as well.

What is claimed is:

1. A liquid meter with an enlarged range of indication mechanism for indicating the residual quantity of fuel in a container, comprising the combination of:
    a power source;
    a fuel meter having one end in electrical circuit with the power source;
    a fuel sender gage which includes a plurality of serially arranged separate resistors arranged on said gage, one end of each resistor of said plurality of resistors being directly connected to the other end of the fuel meter, and a conductor physically arranged on said fuel sender gage adjacent to at least one pair of the plurality of resistors so that one end of the conductor is electrically connected to the power source, and the other end is arranged so that it is connected to one of said pair of resistors at or below a first specific position representing a first level and free from connection to the other of said pair of resistors above said specific position, a float responsive to the level of the residual quantity of fuel in said container which includes a plurality of electrically-connected contacts directly connected to the float and in circuit with each other each connected to a source of reference potential, said float being located on the fuel sender gage and having its contacts arranged relative to the resistors and to the conductor on the fuel sender gage to cause said resistors in circuit with the fuel meter to be changed over one to another through one of said contacts moving with the float at said first specific position of the float and to make electrical contact between one of said contacts and said conductor when said changeover is effected; and a warning indication device connected to the conductor and to the power source for indicating when said resistors have been changed over one to another.

2. A liquid meter with an enlarged range of indication mechanism for indicating the residual quantity of fuel in a container comprising the combination of:

a power source;

a fuel meter having one end in electrical circuit with the power source;

a fuel sender gage which includes a plurality of generally circular arc-shaped resistors arranged on said gage, one end of each resistor of said plurality of resistors being connected to the other end of the fuel meter, and a circular arc-shaped conductor arranged on the fuel sender gage relative to at least one of the plurality of resistors so that one end thereof is connected to the power source and the other end is arranged so that it can be connected to one of a plurality of contacts at a specific position;

a float responsive to the residual quantity of fuel in the container and joined to a conductive arm which includes a plurality of contacts connected to a source of reference potential through the conductive arm and which turns about a fixed point as a pivot, the contacts being arranged relative to the resistors and to the conductor in the fuel sender gage to cause said resistors in circuit with the fuel meter to be changed over one to another through any one of the contacts moving with the float at a specified position of the float and to make electrical contact between one of said contacts and said conductor when said changeover is effected; and a warning indication device connected to the conductor and to the power source for indicating when said resistors have been changed over one to another.

3. A liquid meter with an enlarged range of indication mechanism for indicating residual quantity according to claim 1 or claim 2, wherein said warning indication device is substantially incorporated in said fuel meter.

4. A liquid meter with an enlarged range of indication mechanism for indicating residual quantity according to claim 1 or claim 2, wherein said fuel meter substantially comprises an ammeter.

5. A liquid meter with an enlarged range of indication mechanism for indicating residual quantity according to claim 1 or claim 2, wherein said warning indication device substantially comprises an indicator lamp.

6. A liquid meter with an enlarged range of indication mechanism for indicating residual quantity according to claim 1 or claim 2, wherein one end of the fuel meter is substantially connected to a power source side by way of a regulator for adjustment of the indication on the meter.

7. A liquid meter having an enlarged range indication mechanism for indicating the residual quantity of a liquid in a container, comprising the combination of:

a float responsive to a level of liquid and having a plurality of contacts directly connected to the float each in circuit with the other, a first of which is in circuit with a source of reference potential;

a fuel sender gage comprising a plurality of serially-arranged, separate resistors, an intermediate point between a pair of said resistors being connected to a source of power, and a conductor physically arranged adjacent said separate resistors, a second of the contacts on said float being in electrical contact with one of said plurality of resistors and transferring to electrical contact with another of said resistors at a predetermined level of said fluid, a third of said contacts on said float being in contact with said conductor only after the float reaches said predeterined level where the second contact is in contact with said another of said resistors whereby said one resistor provides a full range indication when the container is full and the other provides a full range of indication when the container is partially full; and a fuel meter having one end connected to a source of power and the other connected to one end of each of said plurality of resistors.

8. The fuel meter of claim 7 wherein each of said plurality of resistors is circular arc-shaped, said conductor is circular arc-shaped, and said contacts are physically connected to the float and electrically connected to a source of reference potential through a conductive arm which rotates through an arc of a circle about a fixed point.

9. The fuel meter of claim 7 or claim 8 further including a warning indication device connected to the conductor and to the power source.

* * * * *